United States Patent [19]

Shubeck

[11] Patent Number: 4,889,268
[45] Date of Patent: Dec. 26, 1989

[54] AUTOMOBILE WINDOW CARD HOLDER

[76] Inventor: Daniel Shubeck, 619 38th Ave., Santa Cruz, Calif. 95062

[21] Appl. No.: 335,821

[22] Filed: Apr. 10, 1989

[51] Int. Cl.⁴ .......................................... B60R 11/00
[52] U.S. Cl. ..................... 224/277; 211/89;
  211/120; 40/124.2; 40/124; 40/591
[58] Field of Search ............... 224/277, 42.46 R; 312,
  224/42.45 R; 211/44, 72, 86, 89, 120; 248/215,
  316.7; 40/124, 124.4, 591, 124.1, 124.2; 24/456

[56] References Cited

U.S. PATENT DOCUMENTS

| | | | |
|---|---|---|---|
| 2,546,855 | 3/1951 | Frame | 40/591 |
| 3,715,821 | 2/1973 | Hawes | 40/591 |
| 4,348,978 | 9/1982 | Brucato | 40/591 |
| 4,827,646 | 5/1989 | Miller et al. | 40/602 |

FOREIGN PATENT DOCUMENTS

| | | | |
|---|---|---|---|
| 2469323 | 5/1981 | France | 224/277 |
| 2043004 | 10/1980 | United Kingdom | 224/277 |

Primary Examiner—Henry J. Recla
Assistant Examiner—Glenn T. Barrett
Attorney, Agent, or Firm—Jeffrey A. Hall

[57] ABSTRACT

A card display device for automobile windows which comprises a strip of material overlapped upon itself to form a series of pockets for holding cards or other advertising material. The top end of the strip is reversely turned to form a retaining flange for locking the strip on the top edge of an automobile window pane when closed. In the preferred embodiment the strip extends beyond the flange perpendicular to the back of the strip thereby forming a handle for carrying and positioning the card holder.

5 Claims, 1 Drawing Sheet

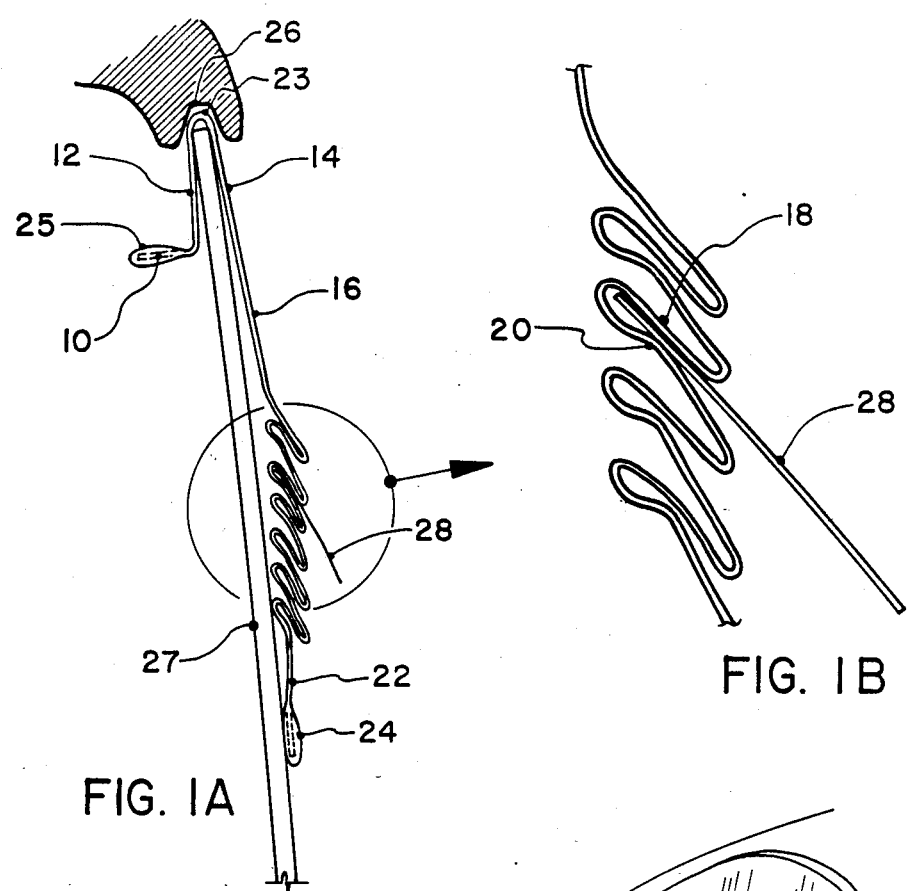
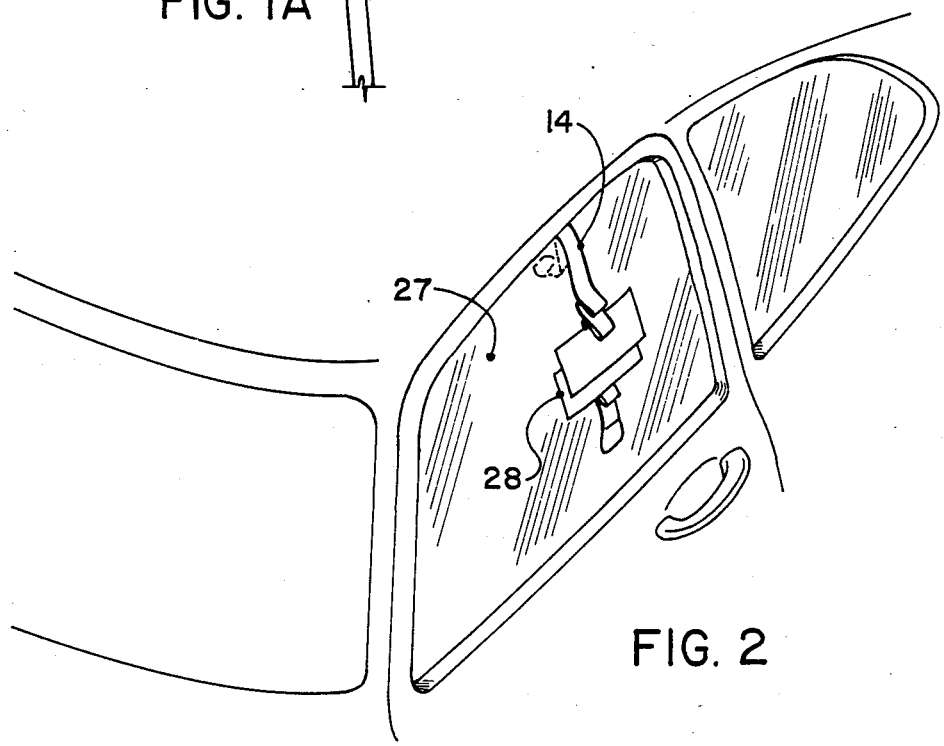

AUTOMOBILE WINDOW CARD HOLDER

BACKGROUND OF THE INVENTION

1. Field of the Invention

This invention relates generally to card holders, especially to card holders for automobile windows.

2. Description of Prior Art

Many, if not most automobile drivers would have occasion to display items in their automobile windows, be it for sale signs, advertisements, or business cards, if means were available.

Heretofore, a wide variety of card display devices have been proposed and implemented, however, such use in automobile windows has not been suggested or recognized.

In promoting enterprise and conveying information, personal and business cards are ubiquitous. It is common for cards to be carried in wallets and purses and distributed by hand. Alternatively, cards are often left in display racks or bowls on desks and counters to be picked up and taken by customers.

One such type of card display rack comprised a thin strip of flexible material with a spring clamp mounted on an elongated strip with the clamp facing the concave side of the strip. This clamp contained a clip that could be slid along the surface to various positions in order to accommodate cards of different sizes without overlapping. Although useful for holding cards for display, this type of card display rack is not usable for displaying cards on automobile windows where the prupose of the display is to distribute the cards to passersby who are interested in obtaining one. Furthermore, this type of card holder could not be locked into an automobile window nor safely secured thereto. In essence, although useful for certain card display applications this type of card display device was not useful or applicable to display and distribution of cards in automobile windows, nor was such use contemplated.

Another type of card display device comprised a strip hanger used for clipping and displaying items such as potato chip bags and the like. In this type of display device a clip is mounted to a base strip through a bracketing strip. The bag or card is held by friction developed between an end of the clip and the surface of the base strip. The clip is mounted to the base through the bracket strip in such a way that force is applied through the end of the clip toward the base holding the bag. The clip typically includes a second end on the side of the bracket strip opposite the first end. The second end may be used for raising the first end away from the base strip so that the bag may be inserted underneath the first end. Although useful for store and business displays this type of strip hanger is not useable for card displays in automobile windows. In fact, such use is not taught or suggested as such strip hangers do not provide for secure attachment to automobile windows or the like, nor was such application contemplated.

Most users therefore would find it desirable to have a convenient method of converting their automobile windows into advertising display by use of an automobile window card holder which could be used whenever the car is stationary or parked.

3. Objects and Advantages

Accordingly I claim the following as objects and advantages of the invention: to provide a card display device for automobile windows wherein the cards to be displayed are arranged in overlapping relationship on the device, to provide such a device that is easily and reliably attached to the automobile window yet cannot be removed from the windows without access to the inside fo the car, thereby allowing cards to be freely taken from the device while preventing removal of the device from the car, to provide such a device which requires a minimum of skill and training to use, and to provide such a device whereby an automobile window can serve as an advertising display mechanism, converting the previously unused window pane space of a parked car into valuable advertising space.

In addition I claim the following additional objects and advantages: to provide an advertising device which can be used with any type of automobile or truck, to provide such a device which can display as well as distribute cards, and to provide such device which can be adjusted for holding cards of a variety of shapes and sizes.

Readers will find further objects and advantages of the invention from a consideration fo the ensuing description and accompanying drawings.

SUMMARY OF THE INVENTION

In the present invention, the automobile window card holder in its simplest form consists of a strip of material, preferably metal, which is folded upon itself to form pockets for holding business of personal cards. For mounting the card holder on the upper edge of an automobile window pane the top edge is bent along a traverse line to form a reversely turned retaining flange, the distance between the flange and the upper portion of the back being just sufficient to receive the top edge portion of a window pane so that when the card holder is mounted thereon there will be a close fit between the glass and the flange. In the preferred embodiment an extension of said strip beyond the flange and perpendicular to the pocket section of said strip provides a convenient handle for carrying and positioning the card holder.

BRIEF DESCRIPTION OF THE DRAWINGS

FIG. 1A shows, in side elevation, an automobile window card holder mounted on a side wondow pane of an automobile with the window closed locking the device in position.

FIG. 1B shows an exploded sectional view of the pocket section of such card holder with card in place.

FIG. 2 shows a perspective top view of such card holder mounted on a side window pane of an automobile with the window closed, locking the card holder in position and with cards positioned for display in holder.

DETAILED DESCRIPTION

FIG. 1A shows an automobile card holder according to the preferred embodiment of the invention. The card holder comprises a strip of material 10 preferably made of metal or acetal which has an upwardly extending rear section 12 and a frontal top section 16. The strip of material 10 is folded upon itself to form pockets defined by upwardly extending portion 18 and downwardly extending portion 20 as seen in FIG. 1B into which card 28 is inserted for display.

For mounting the automobile card holder on an automobile side window pane 27 as shown in FIG. 1A the top portion of the strip 14 is bent to form a reversely turned retaining flange 23 giving a curved hook shape appearance to the top of strip 10. The distance between the flange 23, the upwardly extending rear section 12 and frontal top section 16 being just sufficient to receive the top edge portion of a window pane so that when the device is mounted thereon there will be a close fit between the automobile side window glass 27, the flange 23 and the top portion of window frame 26.

In the preferred embodiment strip 10 is curved slightly outward at 22 putting slight tension on bottom end cover 24 against the window pane. Top end cover 25 may be provided to protect the window pane and for convience in handling the card holder.

In use, the device is mounted on the outer face of the automobile window pane 27, the window pane being lowered sufficiently to permit the flange 23 to be slipped over the top edge of the window pane as illustrated in FIG. 2. The window pane is then raised or closed as far as possible to lock the top flanged edge of the strip 10 between the top edge of the automobile window pane 27 and the top portion of the window frame 26. When the card holder is locked in position, it cannot be removed until the window pane is lowered a sufficient distance to permit disengagement of the flange from the glass pane. In this position with the window pane raised and the door of the automobile locked the card holder is secure from removal or theft. Either before or after being mounted cards or other advertising materials are placed in pockets defined by upwardly extending portion 18 and downwardly extending portion 20. Since the device is located on the outside of the window the cards or advertising material are displayed and accessible to the public.

To remove the card holder the automobile window is lowered a sufficient distance to permit disengagement of the flange from the glass pane. The card holder is then easily removed and stored for later use.

While the above description contains many specificities, the reader should not construe these as limitations on the scope of the invention, but merely as exemplification of preferred embodiments thereof. Those skilled in the art will readily envision many other possible variations are within its scope. For example, skilled artisans will readily be able to change the dimension and shapes of the various embodiments. They will also be able to make the device out of alternative materials such as plastics or urethanes. Therefore the described embodiments of the invention are only considered to be preferred and illustrative of the inventive concept. Accordingly, the reader is requested to determine the scope of the invention by the appended claims and their legal equivalents, and not by the examples which have been given.

I claim:

1. An automobile window card holder, comprising: a strip of sheet material having opposite ends and an intermediate section overlapped upon itself to form a series of pockets extending in the same direction adapted for holding advertising cards or the like, one end of said strip turned reversely to form a retaining flange for locking the strip on the top edge of an automobile window pane when closed.

2. The automobile window card holder of claim 1 wherein said one end of said strip extends beyond said flange substantially perpendicular thereto in an opposite direction from said pockets whereby a convenient means for carrying and positioning the card holder is provided.

3. An automobile window display device comprising a strip of material overlapped upon itself to form a series of pockets and bent at one end to form a hook-shaped retaining flange for locking the strip on the top edge of an automobile window pane.

4. The automobile window display device of claim 3 wherein the one end of the strip extends beyond said flange substantially perpendicular thereto in an opposite direction from said pockets whereby a convenient means for carrying and positioning the display device is provided.

5. An automobile window card holder comprising a strip of material with a top end, a bottom end, and a back, said strip overlapped upon itself to form a series of pockets extending in the same direction and adapted for holding advertising cards, the top end of the strip is turned reversely to form a retaining flange for locking the strip on the top edge of an automobile window pane when closed.

* * * * *